Feb. 4, 1941.  R. J. REIMAN  2,230,908

COVER FOR VEHICLE BODIES

Filed May 9, 1940

Reinhold J. Reiman
INVENTOR

BY Victor J. Evans & Co.
ATTORNEYS

Patented Feb. 4, 1941

2,230,908

UNITED STATES PATENT OFFICE 2,230,908

COVER FOR VEHICLE BODIES

Reinhold J. Reiman, Conrad, Mont., assignor of two-fifths to E. H. Forssman, McLaughlin, S. Dak.

Application May 9, 1940, Serial No. 334,262

6 Claims. (Cl. 296—98)

My invention relates to new and useful improvements in covers for vehicles.

An important object of my invention is the provision of a cover that is particularly adapted to be applied to a vehicle having an open body in a manner to permit the open body to be easily and expeditiously opened or closed as the circumstances require.

Another object of my invention is the provision of a cover of the above-mentioned character that is constructed as a unit, which unit may be easily attached to or removed from the vehicle, and when the unit is attached to the vehicle, no parts thereof will project above or beyond the body to obstruct or in any way hinder the movements of the vehicle or the vision of the driver.

Still another object of my invention is the provision of a cover adapted to be associated with a vehicle body in the manner described above that is simple in construction, inexpensive to manufacture and efficient and efficacious in the performance of its duties.

Other objects and advantages of my invention will be apparent during the course of the following description.

Figure 1:
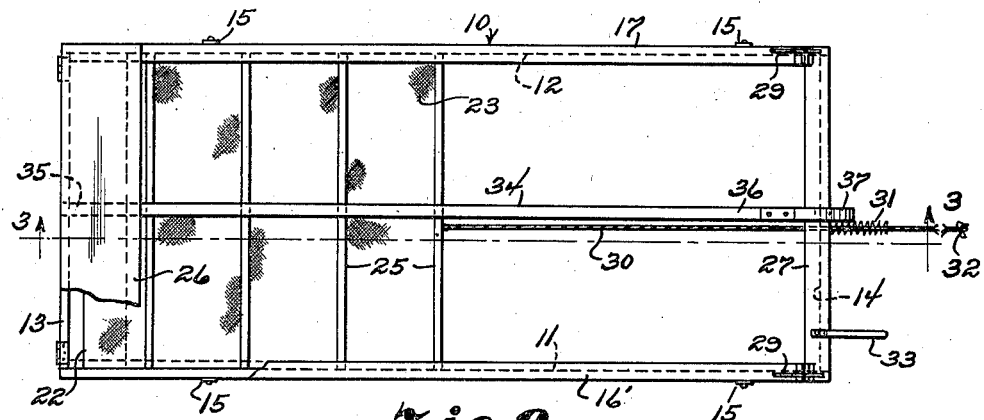
Figure 2:
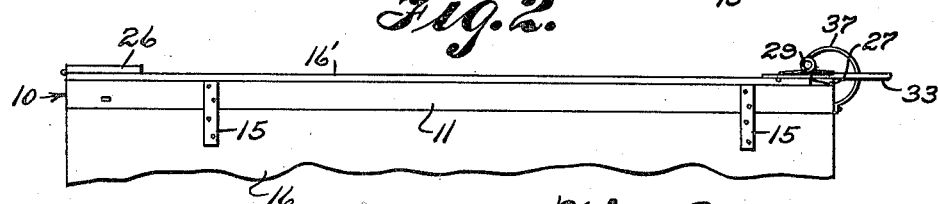
Figure 3:
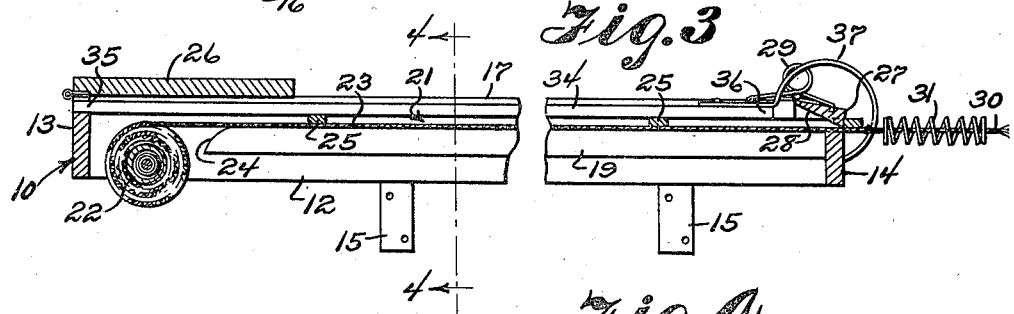
Figure 4:
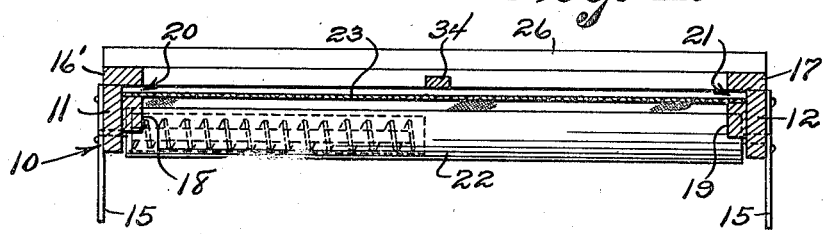

In the drawing, forming a part of this specification, and wherein like numerals are employed to designate like parts throughout the same, Figure 1 is a top plan view of a device embodying my invention, Figure 2 is a side elevation thereof, and showing the same applied to a fragmentary portion of a vehicle body, Figure 3 is a longitudinal sectional view taken on the line 3—3 of Figure 1, and Figure 4 is a transverse sectional view taken on the line 4—4 of Figure 3.

In the accompanying drawing, wherein for the purpose of illustration, is shown a preferred embodiment of my invention, the numeral 10 designates a substantially rectangular frame comprising spaced parallel side members 11 and 12 joined at their ends by the traverse end members 13 and 14. The sides 11 and 12 have depending straps 15 attached to the outer sides thereof, which straps bear against the sides of a vehicle body 16 when the frame is applied thereto.

The vehicle body here represents that portion of a vehicle which is adapted to receive materials to be transported from one place to another, and the present invention particularly contemplates a plain body having a closed construction suitable for the transportation of fungible goods, such as grains, or the like. It is to be understood that while the invention is here illustrated as being applied to a plain-type body, it is in no manner restricted to the same and may have a wide application other than that illustrated. The frame 10 is the same size as the vehicle body whereby the lower edge of the same will abuttingly engage the upper edge of the body in a manner to have a close fitting engagement therewith, and the straps 15 may be connected to the body in any suitable manner to hold the frame localized thereon.

The bars 16 and 17 are mounted on and are coextensive with the upper edges of the members 11 and 12, which bars are of substantially greater width than the said members in a manner to overhang the inner faces thereof, as illustrated in Figure 4. The bars 18 and 19 are secured to the inner faces of the members 10 and 11 in slightly spaced relation to the overhanging portions of the bars 16 and 17 to define longitudinally extending channels or guideways 20 and 21.

The spring roller 22 is journaled between the side members 11 and 12 adjacent the end 13 thereof and substantially below the guideways 20 and 21 whereby the flexible cover or curtain 23 carried by the roller may be moved across the opening defined by the frame to effectively close the open top of the vehicle body. The bars 18 and 19 terminate slightly forwardly of the roller 22 and the ends thereof are rounded, as at 24, to direct the side edges of the curtain into the guideways 20 and 21. The curtain is of sufficient width to permit the side margins thereof to be received by the guideways and, because of its inherently flexible nature, a plurality of spaced transverse rib elements 25 are attached to the upper surface thereof in a manner to tautly stretch the same between the sides of the frame. The rib elements terminate flush with the side edges of the curtain and the opposite ends of the same are slidably received by the guideways 20 and 21. The spring roller 22 normally acts to maintain the curtain and rib elements wound therearound to open the enclosure defined by the frame. As illustrated in Figure 3, the shield plate 26, hingedly attached to the upper edge of the end member 13, extends in superposed relation to the roller in a manner to normally protect the same from materials introduced into the truck body.

The latch bar 27 extends transversely of the frame and is coextensive with the end member 14, which latch bar is hingedly connected to the forward end of the bars 16 and 17. The bottom face of the latch bar is beveled, as at 28, to define a cam face and the springs 29 normally urge the forward or leading edge of the latch bar into engagement with the upper edge of the end member 14.

The flexible cord 30, attached to the foremost rib element 25 of the curtain, extends through a helical spring 31 disposed to seat against the coincidental outer faces of the end member 14 and latch bar 27. The terminal end of the cord is provided with a stop 32 which engages the outer end of the spring when the curtain is wound around the roller 22, in a manner whereby the cord will at all times be positioned to permit the curtain to be drawn across the enclosure of the frame. As the curtain moves to the closed position, the foremost rib element 25 will engage the beveled cam face 28 of the latch bar 27 and the bar will be moved upwardly against the resilient action of the springs 29 to permit the rib element to pass between the latch bar and the end member 14. After the foremost rib element has passed beyond the latch bar resilient action of the springs 29 will move the latch bar in the direction of the end member 14 whereby the leading edge thereof will abuttingly engage the rearward edge of the rib element to hold the same against displacement.

When it is desired to release the curtain, the handle 33 carried by and extending forwardly of the latch bar may be manually grasped and actuated to move the latch bar out of engagement with the foremost rib element to permit the resilient action of the roller 22 to wind the curtain therearound. As soon as the foremost rib element 25 is released by the latch bar, the springs 29 will again urge the leading edge of the bar into engagement with the upper edge of the end member 14, and when the curtain is entirely wound around the roller, the stop 32 at the end of the cord will seat against the extending end of the spring 31. The resilient action of the spring will yieldably and smoothly check the rearward movement of the curtain and, thereafter, the opposed resilient actions of the spring 31 and roller 22 will hold the curtain evenly and smoothly wound around the roller.

To assure the smooth and even winding of the curtain about the roller and to assure the smooth travel of the rib elements in the guideways, I have provided a guide bar 34, the end 35 of which is secured to the end member 13 and the end 36 of which is connected to the end member 14 by the arcuately bent spring arm 37. As illustrated in Figure 3, the arcuate formation of the spring arm will not interfere with the movement of the foremost rib element 25 forwardly of the latch bar 27, but will act to hold the bottom face of the guide bar yieldably pressed against the upper faces of the rib elements. The yieldable pressure of the guide bar is sufficient to prevent a too rapid movement of the ribs in the guideways and to assure the smooth travel of the ribs therealong in a manner to cause the curtain to be smoothly wound around the roller 22. The resilient action of the guide bar will also assure a smooth travel of the rib elements within the guideways when the curtain is being moved to the closed position.

When the frame has been applied to the vehicle body in the above-described manner, the curtain will normally be in the open position and the shield plate 26 will protect the same from the elements. After the vehicle body has been loaded, the curtain may be easily and expeditiously moved to the closed position to hold the materials within the body and to efficaciously protect the same from wind, rain, and the like.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A cover unit for automotive vehicles comprising a peripheral band including parallel side portions having guideways; a spring roller journaled between and at one end of the said parallel side portions; a flexible cover strip carried by the roller; a plurality of transverse, essentially rigid rib elements carried by the cover strip and with the opposite ends thereof received by the guideways; a guide member disposed between the parallel side portions and adapted to yieldably engage the ribs during their travel in the said guideways; and a pivoted latch bar carried by the band at the end thereof remote from the roller and above the cover strip, said bar being adapted to engage one of the ribs to hold the cover in the closed position.

2. A cover unit for automotive vehicles comprising a supporting frame having guideways and adaped to snugly but removably fit the body of a vehicle; a spring roller mounted at one end of the frame and below the said guideways; a curtain carried by the roller and having guides adapted to travel in the said guideways; a spring influenced guide rail disposed above the guideways and adapted to yieldably contact the said guides at all times during their travel in the guideways; a shield mounted on the frame above the roller to protect the same from materials introduced into the vehicle box; and latch means engageable with one of the curtain guides when the curtain is in the closed position to hold the same against the resilient action of the spring roller.

3. A cover unit for automotive vehicles comprising a supporting frame having guideways and adapted to snugly but removably fit the body of a vehicle; a curtain; a plurality of transverse rib elements carried by the cover and with their opposite ends received by the guideways; a spring influenced guide rail carried by the frame in a manner to yieldably engage the said rib elements when the curtain is moved to the closed position; and latch means engageable with one of the rib elements to hold the curtain in the closed position.

4. A cover unit for automotive vehicles comprising a supporting frame having guideways and adapted to snugly but removably fit the body of a vehicle; a curtain; a plurality of transverse rib elements carried by the cover and with their opposite ends received by the guideways; spring means normally holding the curtain in the open position; a spring influenced guide rail carried by the frame in a manner to yieldably engage the said rib elements when the curtain is moved to the closed position; and a spring urged latch member carried by the frame and having a cam face engageable by one of the rib elements to move the said latch into locking engagement with the said rib element when the curtain is moved to the closed position.

5. A cover unit for automotive vehicles comprising a supporting frame having guideways and adapted to snugly but removably fit the body of a vehicle; a curtain; a plurality of transverse rib elements carried by the cover and with their opposite ends received by the guideways; spring means normally holding the curtain in the open position; and a spring influenced guide rail carried by the frame in a manner to yieldably engage the said rib elements when the curtain is moved to the closed position.

6. A cover unit for automotive vehicles comprising a supporting frame having guideways and adapted to snugly but removably fit the body of a vehicle; a curtain; a plurality of transverse rib elements carried by the cover and with their opposite ends received by the guideways; and a spring influenced guide rail carried by the frame in a manner to yieldably engage the said rib elements when the curtain is moved to the closed position.

REINHOLD J. REIMAN.